US007450545B2

(12) United States Patent
Kim et al.

(10) Patent No.: US 7,450,545 B2
(45) Date of Patent: Nov. 11, 2008

(54) APPARATUS AND METHOD FOR DETERMINING SOFT HANDOVER IN A CDMA MOBILE COMMUNICATION SYSTEM PROVIDING MBMS SERVICE

(75) Inventors: Young-Bum Kim, Seoul (KR); Sung-Ho Choi, Songnam-shi (KR); Chae-Man Lim, Seoul (KR); Kook-Heui Lee, Yongin-shi (KR); Soeng-Hun Kim, Suwon-shi (KR); Ju-Ho Lee, Suwon-shi (KR); Joon-Goo Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 900 days.

(21) Appl. No.: 10/463,021

(22) Filed: Jun. 16, 2003

(65) Prior Publication Data

US 2003/0231612 A1 Dec. 18, 2003

(30) Foreign Application Priority Data

Jun. 14, 2002 (KR) ............... 10-2002-0033278

(51) Int. Cl.
*H04Q 7/00* (2006.01)
*H04Q 7/20* (2006.01)
*H04B 7/00* (2006.01)
*H04B 7/216* (2006.01)

(52) U.S. Cl. ............... 370/331; 370/332; 370/335; 370/342; 455/436; 455/442; 455/522

(58) Field of Classification Search ........... 370/342, 370/335, 331, 332, 320, 324, 328, 333, 350, 370/493, 494, 495, 496, 498; 455/436, 442

See application file for complete search history.

(56) References Cited

U.S. PATENT DOCUMENTS

| 6,438,117 B1 * | 8/2002 | Grilli et al. ............... 370/331 |
| 6,445,917 B1 * | 9/2002 | Bark et al. ............... 455/423 |
| 6,584,331 B2 * | 6/2003 | Ranta .................. 455/574 |

(Continued)

FOREIGN PATENT DOCUMENTS

EP     0 845 877 A2    10/1997

(Continued)

OTHER PUBLICATIONS

European Search Report dated Sep. 4, 2003 issued in a counterpart application, namely, Appln. No. 03013656.8.

(Continued)

*Primary Examiner*—Firmin Backer
*Assistant Examiner*—Farah Faroul
(74) *Attorney, Agent, or Firm*—The Farrell Law Firm, PC (57) ABSTRACT

An apparatus and method determines soft handover in a Code Division Multiple Access (CDMA) mobile communication system supporting a Multimedia Broadcast Multicast Service (MBMS) service. In the CDMA mobile communication system supporting an MBMS service, when a User Equipment (UE) moves to a region where it can receive data from a plurality of Node Bs, the UE determines by itself whether to perform soft combining on MBMS data received from the Node Bs. Therefore, even though an MBMS user moves from an existing cell to a new cell, the MBMS service is stably provided, contributing to the convenience of the user.

27 Claims, 5 Drawing Sheets

U.S. PATENT DOCUMENTS

| | | | |
|---|---|---|---|
| 6,768,908 B1 * | 7/2004 | Jalloul et al. | 455/442 |
| 7,042,858 B1 * | 5/2006 | Ma et al. | 370/331 |
| 7,177,658 B2 * | 2/2007 | Willenegger et al. | 455/522 |
| 7,203,512 B2 * | 4/2007 | Jeong et al. | 455/522 |
| 7,254,118 B1 * | 8/2007 | Terasawa et al. | 370/328 |
| 2001/0034233 A1 | 10/2001 | Tiedemann, Jr. et al. | 455/436 |
| 2001/0034254 A1 * | 10/2001 | Ranta | 455/574 |
| 2003/0036384 A1 * | 2/2003 | Chen et al. | 455/437 |
| 2004/0081125 A1 * | 4/2004 | Ranta-Aho et al. | 370/335 |
| 2007/0190997 A1 * | 8/2007 | Moon et al. | 455/422.1 |

FOREIGN PATENT DOCUMENTS

| | | |
|---|---|---|
| JP | 8-501430 | 2/1996 |
| JP | 11-069437 | 3/1999 |
| JP | 2002-010313 | 1/2002 |
| KR | 2002-23283 | 4/2002 |
| WO | WO 95/02309 | 1/1995 |

OTHER PUBLICATIONS

"Universal Mobile Telecommunication System (UMTS); Multimedia Broadcast/Multicast Service (MBMS); Stage 1 (3GPP TS 22.146 version 5.2.0 Release 5)", Mar. 1, 2002, pp. 1-15.

"Universal Mobile Telecommunications System (UMTS); Radio Resource Management Strategies (3G TR 25.922 Version 3.1.0 Release 1999", Mar. 2000, pp. 1-59.

* cited by examiner

APPARATUS AND METHOD FOR DETERMINING SOFT HANDOVER IN A CDMA MOBILE COMMUNICATION SYSTEM PROVIDING MBMS SERVICE

PRIORITY

This application claims priority under 35 U.S.C. § 119 to an application entitled "Apparatus and Method for Determining Soft Handover in a CDMA Mobile Communication System Providing MBMS Service" filed in the Korean Intellectual Property Office on Jun. 14, 2002 and assigned Serial No. 2002-33278, the contents of which are incorporated herein by reference.

BACKGROUND OF THE INVENTION

1. Field of the Invention

The present invention relates generally to soft handover in an asynchronous code division multiple access (CDMA) mobile communication system, and in particular, to an apparatus and method for determining soft handover of a user equipment (UE) supporting a multimedia broadcast/multicast service (MBMS).

2. Description of the Related Art

Recently, due to developments in the communication industry, a service for multicasting multimedia communication for transmitting not only voice service data but also high-capacity data such as packet data and circuit data is being developed in code division multiple access ("CDMA") mobile communication systems. In order to support the multicasting multimedia communication, a broadcast/multicast service is required in which one data source provides a service to a plurality of user equipments (hereinafter referred to as "UEs"). The broadcast/multicast service can be divided into a cell broadcast service (hereinafter referred to as "CBS"), which is a message-based service, and a multimedia broadcast/multicast service (hereinafter referred to as "MBMS") supporting multimedia data, such as real-time image and voice, still image, and text.

CBS refers to a service for broadcasting a plurality of messages to all UEs located in a particular service area. The particular service area where the CBS is provided can be the entire area where the CBS is provided in one cell. MBMS, supporting both voice data and image data, requires a great number of transmission resources. Therefore, the MBMS is provided over a broadcasting channel, because of the possibility that a plurality of services would be simultaneously provided in one cell.

Generally, a UE does not stay within one cell area, but travels from one cell area to another cell area. In this case, an existing voice service or data service can be continued through soft handover. Handover during data transmission/reception can be roughly classified into handover in a CELL_DCH state and handover in a CELL_FACH state.

Handover in the CELL_DCH state occurs when a dedicated channel ("DCH") is set up. Describing a handover procedure in the CELL_DCH state, a UE measures a common pilot channel (hereinafter referred to as "CPICH") and sends a measurement report to a servicing radio network controller (hereinafter referred to as "SRNC"). The SRNC determines from the measurement report from the UE whether to perform handover, and sends a handover command to the UE. Therefore, soft combining can be performed by combining the measurement report from the UE and the handover command from the SRNC.

Handover in the CELL_FACH ("Forward Access Channel") state happens when a common channel is set up. Describing the handover procedure in the CELL-FACH state, a UE determines a best cell by itself by measuring CPICH and performs cell update. In this case, there is no necessity to send a measurement report to an SRNC, but it is not possible to perform soft combining. For these reasons, the MBMS service, for which handover in the CELL_FACH state must be considered since it is serviced over a broadcasting channel, faces a soft combining problem.

SUMMARY OF THE INVENTION

It is, therefore, an object of the present invention to provide a soft handover apparatus and method for a UE receiving an MBMS service in an asynchronous CDMA mobile communication system.

It is another object of the present invention to provide an apparatus and method for allowing a UE to determine by itself whether to perform soft combining, through measurement of a common pilot channel or MBMS data.

In accordance with a first aspect of the present invention, there is provided a method for soft combining multimedia broadcast/multicast service (MBMS) data from a first Node B and a neighboring Node B in a user equipment (UE) of an asynchronous code division multiple access (CDMA) mobile communication system, in which the first Node B provides MBMS data for a MBMS service, the user equipment (UE) receives the MBMS data from the first Node B, and neighboring Node Bs are located adjacent to the first Node B. The method comprises the steps of: collecting MBMS service information of the neighboring Node Bs from the first Node B; determining whether soft combining is required, by comparing a measurement value of a signal received from the first Node B with a measurement value of a signal received from at least one of the neighboring Node Bs; and if soft combining is required, receiving MBMS data from the neighboring Node B where the soft combining is required depending on the MBMS service information and soft combining the MBMS data received from the neighboring Node B with MBMS data from the first Node B.

In accordance with a second aspect of the present invention, there is provided an apparatus for determining whether to soft-combine multimedia broadcast/multicast service (MBMS) data from a first Node B with MBMS data from a neighboring Node B in a user equipment (UE) of an asynchronous code division multiple access (CDMA) mobile communication system, in which the first Node B provides MBMS data for a MBMS service, the user equipment (UE) receives the MBMS data from the first Node B, and neighboring Node Bs are located adjacent to the first Node B. The apparatus comprises: a searcher for receiving signals from the first Node B and the neighboring Node B, and outputting measurement values of the received signals; and a controller for collecting MBMS information of the neighboring Node Bs from the first Node B and assigning fingers to receive MBMS data from the corresponding neighboring Node B for soft combining with the MBMS data from the first Node B if soft combining is required, wherein the MBMS data received from the neighboring Node B according to the MBMS information by the finger assigned to correspond to the neighboring Node B is soft combined with the MBMS data received by the finger assigned to correspond to the first Node B.

In accordance with a third aspect of the present invention, there is provided a method for soft combining multimedia broadcast/multicast service (MBMS) data from a first Node B and a neighboring Node B in a user equipment (UE) of an asynchronous code division multiple access (CDMA) mobile communication system, in which the first Node B provides MBMS data for a MBMS service, the user equipment (UE) receives the MBMS data from the first Node B, and neighboring Node Bs are located adjacent to the first Node B. The method comprising the steps of: determining whether soft combining is required, by comparing a measurement value of a signal received from the first Node B with a measurement value of a signal received from at least one of the neighboring Node Bs; if soft combining is required, collecting MBMS service information from the neighboring Node B where the soft combining is required and receiving MBMS data from the neighboring Node B depending on the MBMS service information; and soft combining the MBMS data received from the neighboring Node B with MBMS data from the first Node B.

In accordance with a fourth aspect of the present invention, there is provided an apparatus for determining whether to soft-combine multimedia broadcast/multicast service (MBMS) data from a first Node B with MBMS data from a neighboring Node B in a user equipment (UE) of an asynchronous code division multiple access (CDMA) mobile communication system, in which the first Node B provides MBMS data for a MBMS service, the user equipment (UE) receives the MBMS data from the first Node B, and neighboring Node Bs are located adjacent to the first Node B. The apparatus comprising: a searcher for receiving signals from the first Node B and the neighboring Node B, and outputting measurement values respectively corresponding to the received signals; and a controller for collecting MBMS information from the corresponding neighboring Node B after comparing the measurement values from the searcher, and assigning fingers to receive MBMS data from the corresponding neighboring Node B for soft combining with the MBMS data from the first Node B, wherein the MBMS data received from the neighboring Node B according to the MBMS information by the finger assigned to correspond to the neighboring Node B is soft-combined with the MBMS data received by the finger assigned to correspond to the first Node B.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Several preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for conciseness.

When a UE receiving MBMS data over a common channel is located in a soft handover region with neighboring cells as it moves to an outer area of a cell providing the MBMS data, the UE needs soft handover for stable reception of the MBMS data. For the soft handover, the UE must fundamentally perform soft combining on the same MBMS data received from a plurality of cells. Therefore, the present invention allows a UE to soft-combine by itself the same MBMS data received from a plurality of cells, thereby efficiently providing the MBMS service. In the following description, the terms "soft handover" and "soft combining" will be referred to as "handover" and "combining" for short, respectively.

Commonly, in an asynchronous mobile communication system, timing synchronization is not provided between Node Bs. Each Node B can have a plurality of cells and each cell has its own timer. A unit of the timer is called a system frame number (SFN). Therefore, when a radio network controller (RNC) transmits MBMS data for the MBMS service to Node Bs, if there is no separate synchronization process between the Node Bs, then the Node Bs will transmit the MBMS data to the UE at different times. In this case, the UE cannot perform soft combining when it moves to a new cell, it, whereas the UE can soft-combine data on a dedicated channel when it is located in a soft handover region. Therefore, a difference between MBMS data transmission times of Node Bs providing the MBMS data must be minimized in order to enable the UE to perform soft combining by itself.

In an asynchronous mobile communication system having, for example, one RNC and two Node Bs, a transmission delay between the RNC and one Node B may be different from a transmission delay between the RNC and the other Node B. Since the two Node Bs are not synchronized, MBMS data transmitted from the two Node Bs to a UE does not arrive at the UE at the same time. Even though the two Node Bs transmit the MBMS data at the same time, a time when the MBMS data from one Node B arrives at the UE is not identical to a time when the MBMS data from the other Node B arrives at the UE. However, for soft combining in the UE, it is possible to set a transmission time so that the same signals from the two Node Bs can arrive within a certain time window.

It is assumed that MBMS data from the RNC is transmitted along with a connection frame number (CFN) value when it arrives at the Node Bs. That is, the MBMS data has a CFN value, and the Node Bs must determine a certain point of SFN, a time axis of the Node Bs, at which it will transmit the MBMS data. The CFN value has a value between 0 and 255, and the SFN has a value between 0 and 4095. Therefore, a transmission time of MBMS data having, as CFN, a remainder value determined by dividing a particular SFN by 256, i.e., a result value (SFN mod 256) obtained by performing a modulo-256 operation on SFN, is determined as transmission starting point (i.e. where SFN mod 256 equals CFN is the "certain point" mentioned above). For example, a time at which SFN=3076 is defined as a transmission time of MBMS data with CFN=4. It is noted that timing synchronization is not provided between Node Bs in an asynchronous mobile communication system. Each Node B can have a plurality of cells and each cell has its own timer by using a system frame number (SFN). Therefore, each Node B needs to determine the specific SFN when it transmits data.

It can be assumed that MBMS data with a particular CFN received from the RNC is transmitted at SFN(N) in a cell #1 and at SFN(M) in a cell #2 (where M and N are distinct values). As a result, MBMS data with the same CFN value is transmitted at different times in cell #1 and cell #2. This is because transmission delay times between the RNC and the cells are different from each other.

Assuming that a UE is located in a handover region where a service area by a cell #1 overlaps with a service area by a cell #2, and the cell #1 and the cell #2 provide the same MBMS service, the UE receives the same MBMS data from the cell #1 and the cell#2. The same MBMS data has the same CFN. However, a time when the MBMS data from the cell #1 is received at the UE may be different from a time when the MBMS data from the cell #2 is received at the UE. This may be caused by an error occurring at a transmission time of the cell #1 and a transmission time of the cell #2, and an error due to transmission delays occurring between the UE and the cell #1 and cell #2.

At a reception time of a UE receiving MBMS data from the cell #1 and the cell #2, the UE combines data received at SFN(N) from the cell #1 with data received at SFN(M) from the cell #2 (where M and N are distinct values), for corresponding CFN data. However, when times at which the same CFN is received are different and a difference between the reception times is larger than or equal to a predetermined value (e.g., 256 chips), it might not be possible for a UE to store previously received data in a buffer for combining. Therefore, there is a demand for a method of preferentially synchronizing a transmission time of each Node B so that data received by a UE located in a handover region falls within a predetermined time window.

In order to synchronize times at which the cells transmit the same MBMS data and to allow a UE to soft-combine the same MBMS data whose transmission times are synchronized, the following steps are performed.

Step 1: In order to acquire timing information for Node Bs in one RNC, an SFN-SFN observed time difference is measured and then delivered to the RNC.

Step 2: The RNC analyzes a timing relationship between Node Bs by using the information (SFN-SFN observed time difference) acquired in Step 1, and determines an MBMS offset necessary for Node Bs.

Step 3: The RNC transmits the MBMS offset determined in Step 2 to corresponding Node Bs and a corresponding UE.

Step 4: Before transmission of MBMS data, a timing relationship between an RNC that transmitted data and a Node B is previously determined so that a Node B can transmit the data according to the MBMS offset determined in Step 3 (User Plane Synchronization).

Step 5: MBMS data is transmitted according to the timing relationship determined in Step 4.

A synchronization procedure between Node Bs through the above 5 steps has been filed by the applicant of this invention in the Korean Industrial Property Office and assigned serial number 2002-23283, the contents of which are incorporated herein by reference.

First Embodiment

In the present invention, when soft handover is required, a UE performs soft combining by itself. For this purpose, the UE requires MBMS service information provided from neighboring cells. Therefore, a radio network controller (hereinafter referred to as "RNC") provides code information and timing information for neighboring cells of the UE to the UEs via the cells that currently provide the MBMS service. To achieve this, a signaling procedure between a Node B, an RNC and a UE for MBMS soft combining can be roughly divided into (1) a Radio Bearer Setup process, (2) a Radio Bearer Reconfiguration process, and (3) a Cell Update process.

First, the radio bearer setup process represents a signaling procedure performed until a UE initially receives MBMS data. Second, the radio bearer reconfiguration process represents a signaling procedure performed when a peripheral environment has changed although a UE does not move. That is, the radio bearer reconfiguration process represents a signaling procedure performed when a new radio bearer must be configured since information on neighboring cells providing an MBMS service, including the current cell, has changed. Third, the cell update process represents a signaling procedure performed when a peripheral environment has changed due to movement of a UE. That is, the cell update process represents a signaling procedure performed when cell update must be performed when a peripheral environment has changed due to movement of the UE.

Common to the above three signaling procedures, an RNC provides information of Table 1 about neighboring cells to all of the cells to which a UE currently belongs, in order to perform a method of allowing a UE to soft-combine MBMS data by itself. In Table 1, Info #1 represents ID (Identifier) information for the cells providing the same MBMS service as the current cell does, from which the UE receives the MBMS service, among neighboring cells of the UE. From this value, the UE searches cells providing the same MBMS service as the current cell does, among its neighboring cells. Info #2 is MBMS code information of a neighboring cell corresponding to the Info #1, and indicates a scrambling code and a channelization code. Therefore, when performing soft combining, the UE can accurately despread signals of respective paths. Info #3 is service ID information of a neighboring cell providing an MBMS service, and indicates a type of the MBMS service. Since Info #3 is information indicating a type of the MBMS service provided from a neighboring cell, if a neighboring cell to which a UE will move during handover or while performing soft combining is already providing the same service as a currently received MBMS service, the UE can perform soft combining. Sometimes, if a neighboring cell to which the UE will move is not providing the same MBMS service as a currently received MBMS service, the UE may not be able to perform combining or request the cell to start the same MBMS service. Info #4 includes information representing a time difference between a transport frame start point of MBMS data from a corresponding neighboring cell and a CPICH frame start point, and from this value, the UE can perform soft combining on the same symbols received through the respective paths at different times.

TABLE 1

| | |
|---|---|
| Info #1 | ID information of neighboring cells transmitting the same service as a corresponding MBMS service |
| Info #2 | Code information by which a corresponding MBMS service from neighboring cells is transmitted (Scrambling code, Channelization code) |
| Info #3 | ID information for a service transmitted in a corresponding MBMS service from neighboring cells |
| Info #4 | Time offset information for a corresponding MBMS service from neighboring cells |

A detailed description will now be made of embodiments of the present invention with reference to the accompanying drawings. In the following description, it will be assumed that one Node B supports one cell.

Figure 1:
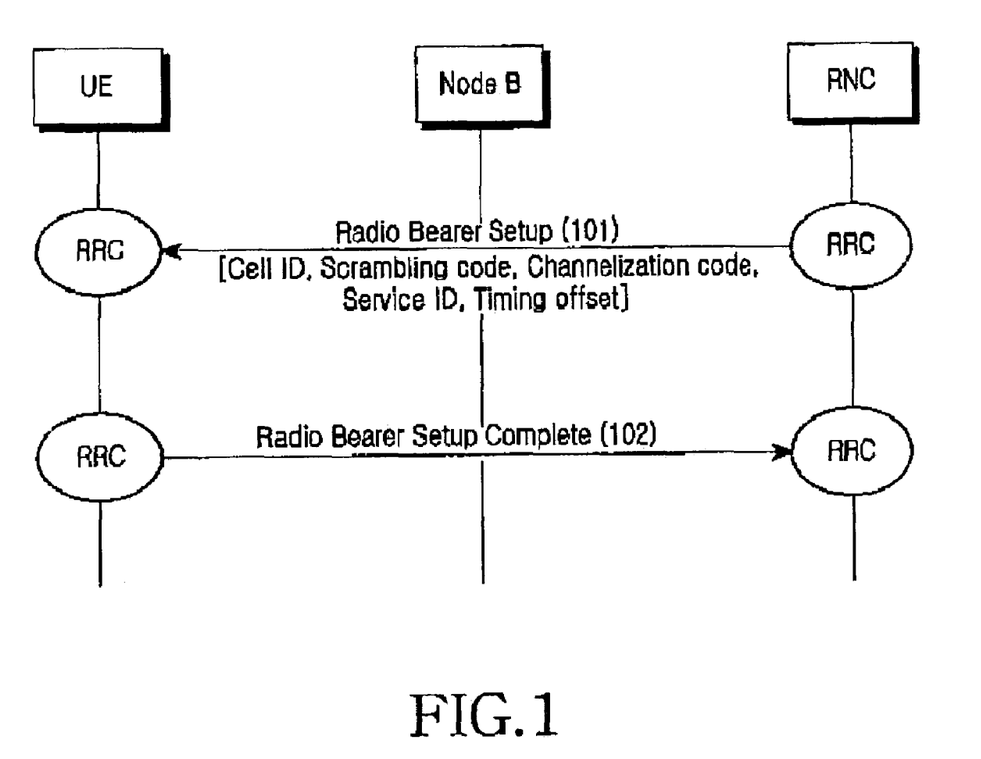
FIG. 1 is a flow diagram illustrating a signaling procedure for a radio bearer setup process in an asynchronous CDMA mobile communication system according to an embodiment of the present invention.

FIG. 1 is a flow diagram illustrating a signaling procedure for a radio bearer setup process among the three signaling processes. Specifically, FIG. 1 illustrates an initial process for MBMS data transmission.

Referring to FIG. 1, an RNC transmits to a UE a Radio Bearer Setup RRC message for requesting the radio bearer setup in step 101. The Radio Bearer Setup RRC message is a message exchanged between an RRC (Radio Resource Control) layer of the RNC and an RRC layer of the UE. The Radio Bearer Setup RRC message is used to transmit MBMS code information, service information, and MBMS timing offset information of a cell currently providing an MBMS service so that the UE can receive MBMS data. The MBMS code information is code information for transmitting the MBMS data, and indicates scrambling code information and channelization code information. The MBMS code information enables the UE to perform despreading on MBMS data from a current cell. The service information is information on a service including the MBMS data, and can be provided in the form of a service ID. The UE can distinguish different services by using the service ID. The MBMS timing offset information is timing information of a channel transmitting the MBMS data, and represents a difference between a transport frame start point of the MBMS data and a CPICH frame start point. Therefore, when performing soft combining like the Info #4 of Table 1, the UE can perform soft combining on the same symbols received through respective paths at different times.

Unlike in the existing soft handover process on a dedicated channel, the information of Table 1 about neighboring cells of a UE is provided to the UE through the Radio Bearer Setup RRC message in order to allow the UE to perform soft handover by itself according to an MBMS service.

After completing the radio bearer setup based on the information provided from the RNC, the UE transmits to the RNC a Radio Bearer Setup Complete RRC message for reporting completion of the radio bearer setup in step 102, finishing the radio bearer setup process.

Through the radio bearer setup operation, the UE can receive desired MBMS data from a Node B. If the UE moves to a handover region while receiving the desired MBMS data, the UE can soft-combine MBMS data from a current cell with MBMS data from neighboring cells based on previously known information from the neighboring cells.

Figure 2:
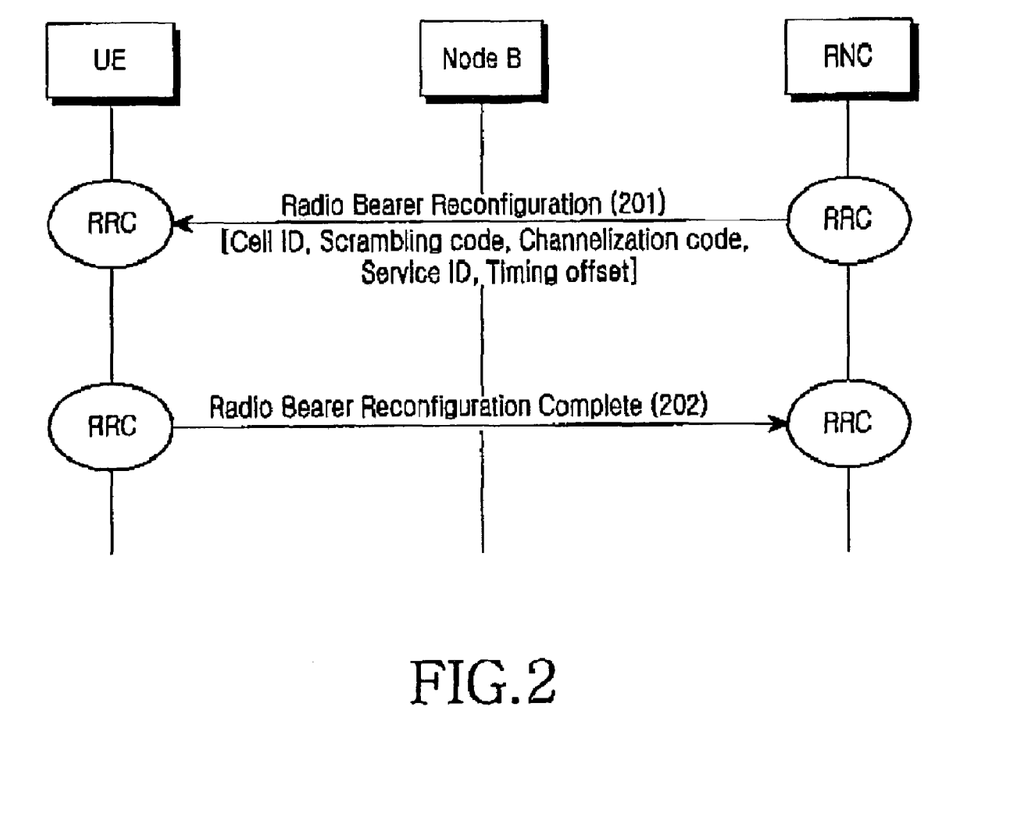
FIG. 2 is a flow diagram illustrating a signaling procedure for a radio bearer reconfiguration process in an asynchronous CDMA mobile communication system according to an embodiment of the present invention.

FIG. 2 is a flow diagram illustrating a signaling procedure for a radio bearer reconfiguration process. The radio bearer reconfiguration process is a process of modifying an initially configured radio bearer, and performs an update process of changing previously set information, adding a new cell to an active set, or deleting an existing cell from the active set.

The radio bearer reconfiguration process is performed when information on a current cell or a neighboring cell has changed as follows, even though the UE does not move.

(1) Change in Information on Current (or Corresponding) Cell

The MBMS code information, service information and MBMS timing offset information of the current cell are changed.

(2) Change in Information on Neighboring Cell

A. Addition or Deletion of Neighboring Cell

A neighboring cell providing the same MBMS service is added or deleted. In this case, cell ID information of a corresponding cell can be provided.

B. Change in Existing Neighboring Cell Information

Like in (1), information on a neighboring cell providing the same MBMS data as the current cell does has changed. In this case, the MBMS code information, service information and MBMS timing offset information are changed.

A signaling procedure for the radio bearer reconfiguration between a UE and an RNC is similar to the signaling procedure for the radio bearer setup. However, while the radio bearer setup is a signaling procedure for receiving initial MBMS data, the radio bearer reconfiguration is a signaling procedure performed when existing configuration is required to be changed when a peripheral environment of the UE has changed while the UE is already receiving MBMS data.

Referring to FIG. 2, an RNC provides a Radio Bearer Reconfiguration RRC message to a UE in step 201, thereby performing an operation of configuring a modified radio bearer. Like in the radio bearer setup process, the RNC provides the UE with MBMS code information, service information and MBMS timing offset information of a cell currently providing a MBMS service, through the Radio Bearer Reconfiguration RRC message. In addition, the RNC also provides the information of Table 1 about a neighboring cell so that the UE can perform soft handover on a current MBMS service by itself. After performing the radio bearer reconfiguration operation based on the information provided from the RNC, the UE transmits to the RNC a Radio Bearer Reconfiguration Complete message for reporting completed reconfiguration of the radio bearer in step 202, thereby completing the radio bearer reconfiguration.

Through the radio bearer setup or the radio bearer reconfiguration, the UE always has information on all cells providing the same MBMS service as the current cell does, among its neighboring cells. Therefore, if the UE is located in a handover region, the UE can perform soft combining by itself.

Figure 3:
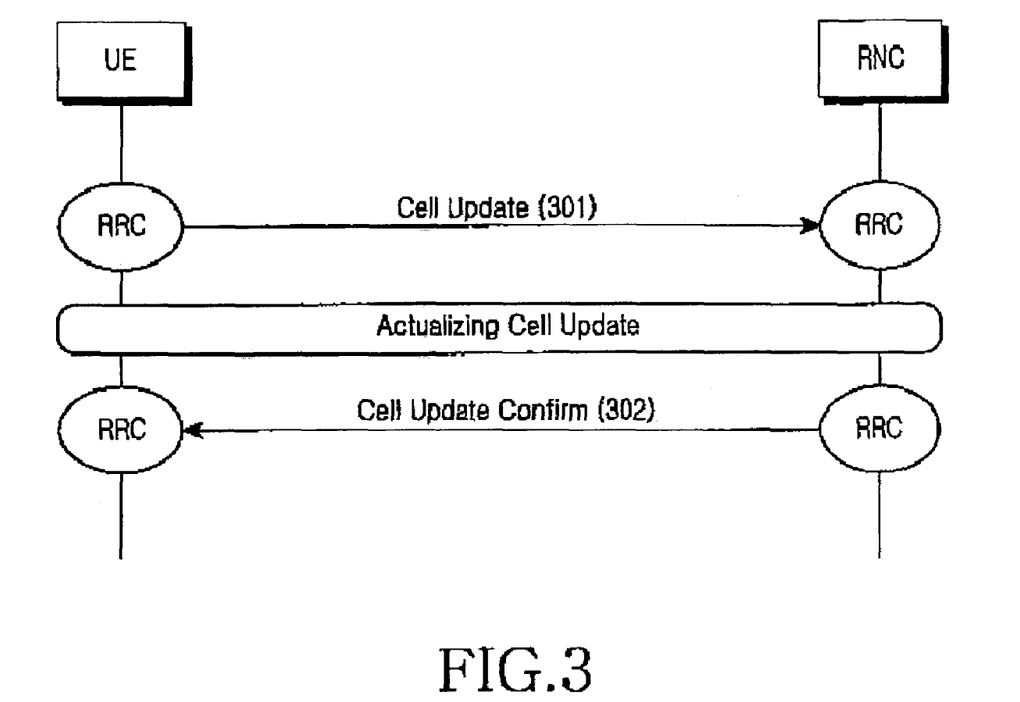
FIG. 3 is a flow diagram illustrating a signaling procedure for a cell update process in an asynchronous CDMA mobile communication system according to an embodiment of the present invention.

FIG. 3 is a flow diagram illustrating a signaling procedure for a cell update process. The cell update process is a signaling procedure between an RNC and a UE performed when a peripheral environment has changed due to movement of the UE. The cell update process is performed by the UE when the UE enters a cell update region by moving from the existing cell to a neighboring cell. Like the handover region, the cell update region exists around a cell boundary. The cell update region is smaller in size than the handover region, and included in the handover region. That is, through the radio bearer setup/reconfiguration processes, the UE can perform soft combining in a handover region. At this moment, if the UE enters a cell update region, it performs cell update. In this case, the UE starts a cell update process by transmitting a Cell Update RRC message to an RNC in step 301 of FIG. 3.

When the cell update is performed, a target cell, i.e., a cell to which the UE transmits a Cell Update message, can be separately described with reference to the following two cases.

In a first case, the target cell is already transmitting MBMS data, so the UE is already receiving MBMS data in a handover region before the cell update process. In this case, if a Cell Update RRC message is received from the corresponding UE, the RNC updates the target cell as a cell providing a current MBMS service, and updates the cell providing the existing MBMS service as a neighboring cell. In addition, the RNC updates information on a cell providing the same MBMS service as the target cell does, among neighboring cells of the target cell. Therefore, in the radio bearer setup/reconfiguration processes, the same message as that provided from the RNC to the UE is transmitted to the UE. Transmission of this message is finally performed through a Cell Update Confirm RRC message in step 302 of FIG. 3. In this case also, since the UE is still located in the handover region, the UE continuously performs soft combining.

In a second case, the target cell is not transmitting MBMS data, so no MBMS data is received from the target cell when the UE enters a handover region. When the UE enters a cell update region in the handover region, the cell update process is performed. At this point, the RNC receives a Cell Update message from the UE and enables the target cell to transmit the MBMS data that the UE is currently receiving. That is, the same signaling procedure as the radio bearer setup process as shown in FIG. 1 is performed. Then, the existing cell providing the MBMS service to the UE is updated as a neighboring cell, and information on a cell providing the same MBMS service as the target cell does, among neighboring cells of the target cell, is updated. The update is completed by transmitting a Cell Update Confirm RRC message from the RNC to the UE in step 302 of FIG. 3. Even in the cell update process, the UE continuously receives MBMS data from the existing cell, and after the cell update, receives the MBMS data even from the target cell, so that it can perform soft combining.

Figure 4:
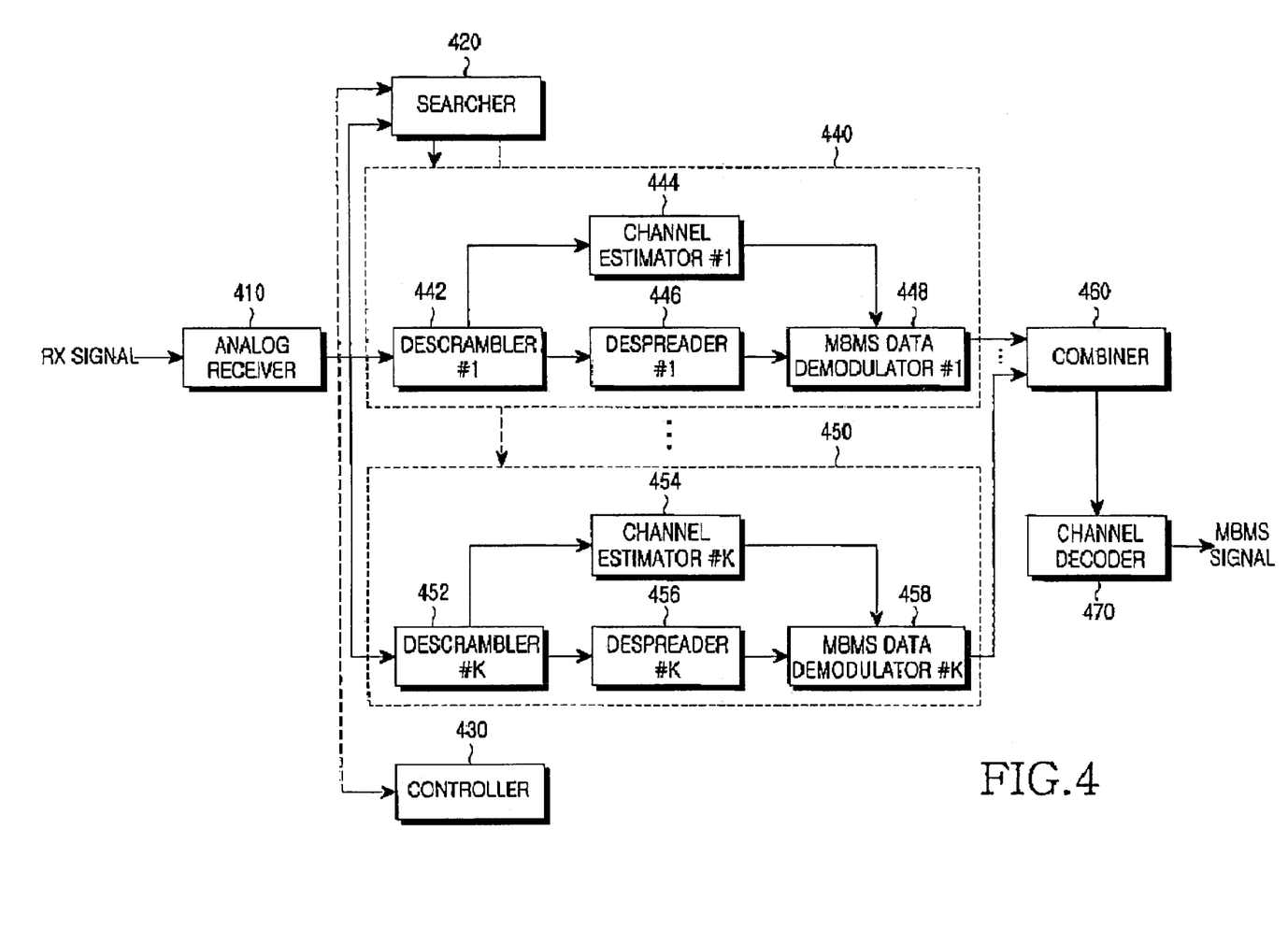
FIG. 4 is a block diagram illustrating a structure of a UE receiver in an asynchronous CDMA mobile communication system according to an embodiment of the present invention.

FIG. 4 is a block diagram illustrating a structure of a UE receiver for MBMS soft combining according to an embodiment of the present invention. The entire procedure for soft combining MBMS data according to the present invention will be described with reference to FIG. 4. A signal received from a Node B is provided to an analog receiver 410. The analog receiver 410 converts the received signal into a digital signal. The converted digital signal from the analog receiver 410 is applied to a searcher 420 and a finger assigned to the searcher 420, among k fingers 440 and 450.

A controller 430 receives information on neighboring cells from an RNC, and knows which cell provides the same MBMS service as the current MBMS service. Therefore, for soft combining of MBMS data, the controller 430 controls the searcher 420 to search cells providing the same MBMS service among neighboring cells.

The searcher 420 measures CPICH values of multipath signals received through the analog receiver 410. The measured values are CPICH RSCP (Received Signal Code Power) or CPICH Ec/No (signal-to-noise) values, and used in monitoring reception strength of a corresponding signal. The searcher 420 delivers the measured parameter value to the controller 430.

The controller 430 controls the searcher 420 to assign an appropriate finger from CPICH parameter values of respective signal components from the searcher 420. That is, the controller 430 arranges the CPICH parameter values in order of size and sends a finger assignment command to the searcher 420.

The searcher 420 receives the finger assignment command from the controller 430, and assigns a signal to each finger according to the finger assignment command from the controller 430. The searcher 420 provides timing information and cell information (scrambling code and channelization code) to each finger so that a combiner 460 can perform combining.

For example, there is a case where a UE currently receiving MBMS data moves to a possible handover region. That is, it can be assumed that the UE moves from a particular cell A to a neighboring cell B. The cell B is a Node B that is providing an MBMS service. In this case, a signal received by the searcher 420 includes both of a multipath signal from the cell A and a multipath signal from the cell B. Therefore, the searcher 420 measures CPICH values of both of the multipath signals from the cell A and the cell B, and delivers the measured values to the controller 430.

Meanwhile, the controller 430 sums up measured parameter values of a multipath signal component from the cell B, and compares the summed value with a summed value determined by summing up measured parameter values of a multipath signal component from the cell. A, to thereby determine whether any one of the following two conditions is satisfied. In a first condition, a value determined by summing up measured parameter values of a multipath signal component from the cell B is larger than a predetermined threshold or more than a value determined by summing up measured parameter values of a multipath signal component from the cell A. In a second embodiment, a signal strength difference between the cell A and the cell B is less than a predetermined hysteresis value.

If any one of the two conditions is satisfied, the controller 430 determines whether the cell B provides an MBMS service based on neighboring cell information acquired by the radio bearer setup/reconfiguration processes, and determines whether the cell B provides the same MBMS service as the cell A does.

In another condition in addition to the above two conditions, if a value determined by summing up measured parameter values of a multipath signal component from the cell B is larger than a predetermined threshold, the controller 430 may be so realized as to determine whether the cell B and the cell A provide the same MBMS service. In this case, the predetermined threshold has a meaning different from that of the threshold used in the first condition. That is, the threshold in the first condition corresponds to an error value between a value measured through the cell B and a value measured through the cell A, whereas the threshold in the added example corresponds to a value measured through the cell B. Therefore, when comparing the two thresholds, the threshold in the added example must be set to a value larger than the threshold in the first condition.

Meanwhile, if it is determined that the cell B is providing the same MBMS service as the cell A does, the controller 430 determines to soft-combine MBMS data from the cell A and the cell B. For that purpose, the controller 430 controls the searcher 420 so that multipath MBMS signal components from the cell A and the cell B are assigned to the fingers in order of size. Generally, finger assignment is performed in order of higher strength of the received signals. Therefore, in order to perform soft combining, at least one of the multipath signal components received from the cell A and the cell B among the paths satisfying the condition must be assigned to a corresponding finger. When assigning the signal components to the finger, the searcher 420 provides timing information (frame offset) and cell information (scrambling code and channelization code) between the signal components in order to finally enable soft combining. In addition, a frame offset of an MBMS signal between cell paths, received by the UE, can be different from an offset value of a CPICH signal between cell path. Therefore, during finger assignment by the searcher 420, the controller 430 informs a corresponding finger of the frame offset value of each MBMS signal.

When the cell B is not providing the same MBMS service, soft combining cannot be performed even though the above conditions are satisfied. Therefore, in this case, finger assignment is performed on only the multipath signal component from the cell A that was previously providing the MBMS service. However, when the cell B is transmitting the different MBMS data from that transmitted by the cell A, the UE can request the RNC to transmit the same MBMS data as the cell A transmits, thereby enabling soft combining of the MBMS data.

When the UE is located only in an area of the cell A or does not undergo soft handover due to failure to satisfy the soft combining condition, an MBMS signal component assigned to each finger becomes a multipath signal component from the cell A.

In the above two conditions, it is assumed that CPICH RSCP or CPICH Ec/No of a received CPICH signal is excellent. However, even though CPICH RSCP or CPICH Ec/No of the received CPICH signal is not excellent, an actual MBMS data signal may be excellent. In this case, if soft combining is determined with only the CPICH signal, an opportunity to perform soft combining is missed. Therefore, in order to prevent such a situation, the controller 430 uses not only the CPICH but also the MBMS data signal as a criterion for soft combining.

If an MBMS data signal is determined to be assigned to a finger through the above-stated procedure, the controller 430 informs the corresponding finger of an MBMS offset value provided from the RNC so that a combiner 460 can combine each signal component.

Herein, a block for demodulating a particular multipath component of an MBMS data signal will be referred to as "finger," and the finger is comprised of a descrambler, a despreader, an MBMS data demodulator, and a channel estimator. FIG. 4 shows k fingers 440 and 450. In the following description, it will be assumed that all of the k fingers are assigned.

The digital signal from the analog receiver 410 is provided to descramblers 442 and 452 of the k fingers 440 and 450. Each of the descramblers 442 and 452 multiplies the converted digital signal by a scrambling code for identifying the Node B, thereby generating a descrambled signal. The scrambling code is provided from the searcher 420 as cell information in response to a command from the controller 430. The controller 430 previously knows the scrambling code through the radio bearer setup process or the radio bearer reconfiguration process.

MBMS data output from the descramblers 442 and 452 is provided to corresponding despreaders 446 and 456. The despreaders 446 and 456 despread the MBMS data by a channelization code provided from the searcher 420. The MBMS data despread by the despreaders 446 and 456 is provided to corresponding MBMS data demodulators 448 and 458. The MBMS data demodulators 448 and 458 are provided with channel estimation values from corresponding channel estimators 444 and 454. The channel estimators 444 and 454 generate the channel estimation values by receiving outputs of the descramblers 442 and 452.

Therefore, the MBMS data demodulators 448 and 458 perform channel compensation on the outputs of the despreaders 446 and 456 by using the channel estimation values from the channel estimators 444 and 454, thereby extracting MBMS data signals received through respective paths. Here, the MBMS data signals received through respective paths can become MBMS multipath signals transmitted from several cells. Alternatively, the MBMS data signals become signals of an MBMS multipath component that a corresponding cell is currently providing.

The signals of the MBMS multipath component output from the MBMS data demodulators 448 and 458 are provided to the combiner 460. The combiner 460 combines the signals of the MBMS multipath component provided from the MBMS data demodulators 448 and 458, i.e., from the fingers 440 and 450, and provides a combined signal to a channel decoder 470.

An operation of the combiner 460 will be described in more detail. An MBMS data signal assigned to each finger is stored in a buffer and combined by the combiner 460. As described above, since transmission times of the same MBMS data from respective cells are synchronized to limit a time difference therebetween to several hundreds of chips, each signal component can be combined by the combiner 460.

Since the combiner 460 knows a frame offset value of the MBMS signal assigned to all fingers by the controller 430, it performs combining on the MBMS data signals stored in the buffer by considering a frame offset value between respective signals. That is, the combiner 460 matches symbol output timings of all fingers to a symbol output timing of a reference finger to which an MBMS data signal having the earliest reception timing is assigned, by applying relative frame offset values of corresponding cells assigned to the fingers, thereby combining the same symbols from difference fingers. This is possible because the RNC and the UE previously know MBMS offset information through the radio bearer setup/reconfiguration processes. The combined MBMS multipath signal is finally restored to an MBMS signal through channel decoder 470.

Each process of the MBMS soft handover procedure according to an embodiment of the present invention will now be described in detail with reference to the accompanying drawings. In the following description, it will be assumed that a UE is located in a handover region where it can simultaneously receive MBMS data from two or more cells.

Figure 5:
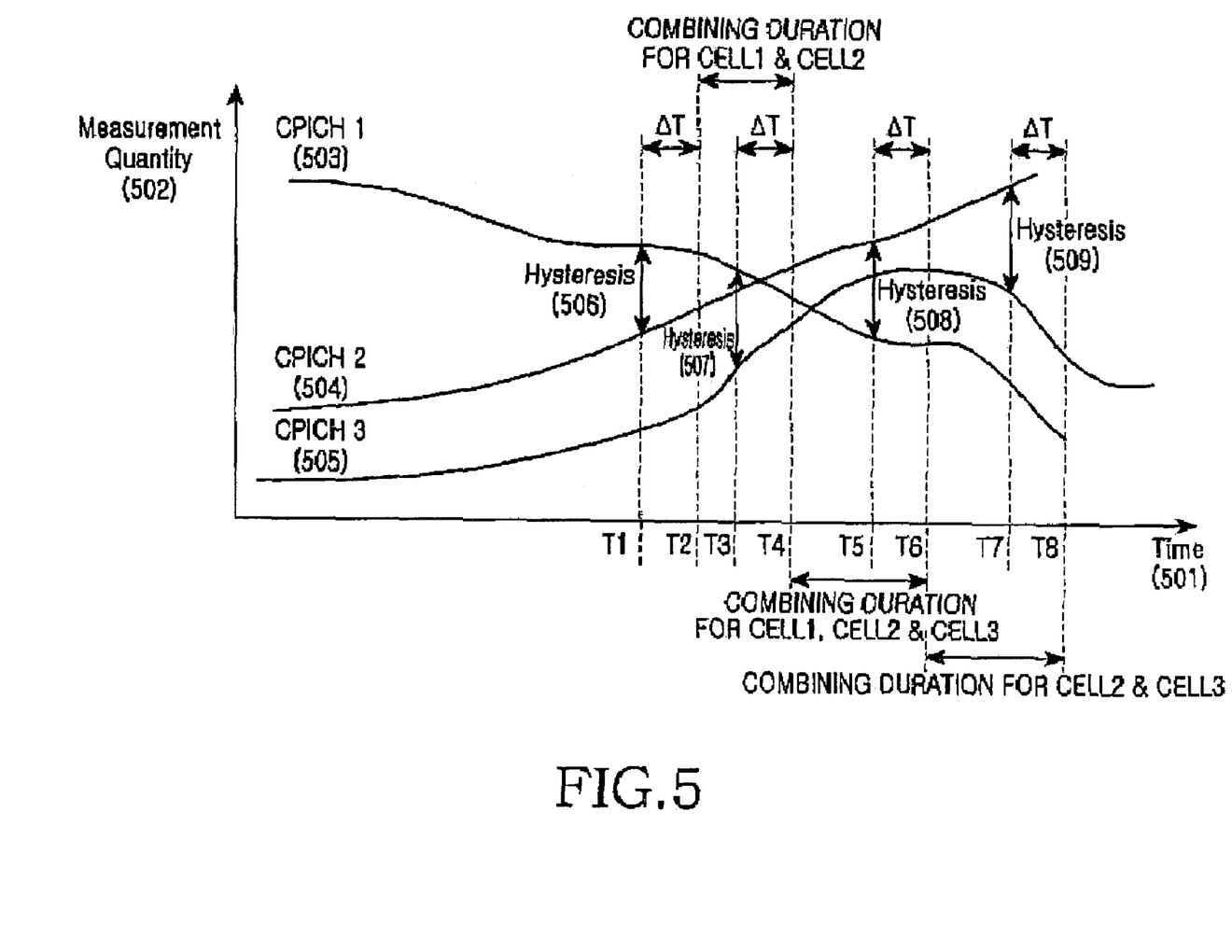
FIG. 5 illustrates a soft combining procedure of a UE according to an embodiment of the present invention.

FIG. 5 illustrates a soft combining procedure according to an embodiment of the present invention. Referring to FIG. 5, a UE receives MBMS data on CPICH1 503 from a cell #1 until a time T1 on a time axis 501. If a measurement value of CPICH2 504 received from a cell #2 is lower than a hysteresis value 506 corresponding to the measurement value of the CPICH1 503 at the time T1, the UE sets a timer while preparing for soft combining. At a time T2 when the set timer expires after a lapse of a time T, a difference between the measurement value of the CPICH1 503 and the measurement value of the CPICH2 504 is not larger than the hysteresis value 506 at the time T1, so the UE soft-combines MBMS data received from the cell #1 and the cell #2. Thereafter, at a time T3, a difference between the measurement value of the CPICH1 503 and a measurement value of CPICH3 505 from a cell #3 shows a hysteresis value 507, so the UE sets a timer. At a time T4 when the set timer expires after a lapse of a time T, the UE checks a difference between the measurement value of the CPICH1 503 and the measurement value of the CPICH3 505. Since the difference is not larger than the hysteresis value 507, the UE additionally performs soft combining on MBMS data received from the cell #3. Therefore, after the time T4, the UE soft-combines all of the MBMS data from the cell #1, cell #2 and cell #3. At a time T5, a difference between the measurement value of the CPICH1 503 and the measurement value of the CPICH2 504 shows a hysteresis value 508, so the UE sets a timer in order to check again whether to perform soft combining. At a time T6 when a time T has elapsed by the set timer, a difference between the measurement value of the CPICH1 503 and the measurement value of the CPICH2 504 is larger than the hysteresis value 508, the UE excludes MBMS data from the cell #1 from soft combining. Therefore, after the time T6, the UE soft-combines MBMS data received from the cell #2 and the cell #3. Finally, at a time T7, a difference between the measurement value of the CPICH2 504 and the measurement value of the CPICH3 505 shows a hysteresis value 509, so the UE sets a timer in order to determine again whether to perform soft combining. At a time T8 when a time T has elapsed by the set timer, a difference between the measurement value of the CPICH2 504 and the measurement value of the CPICH3 505 is larger than the hysteresis value 509, so the UE excludes MBMS data from the cell #3 from soft combining. As a result, after the time T7, the UE receives MBMS data only from the cell #2.

In FIG. 5, the hysteresis values 506, 507, 508 and 509 may have either the same value or different values. For example, the hystereses 506 and 507 with the same value, which become a criterion for including MBMS data in soft combining, and the hystereses 508 and 509 with the same value, which become a criterion for excluding MBMS data from soft combining, have different values.

Second Embodiment

In the foregoing first embodiment, it is suggested that a UE perform soft combining by itself the same data as MBMS data received from a current cell and a neighboring cell.

In second embodiment, the present invention allows a UE to soft-combine by itself the same MBMS data as MBMS data received from a neighboring cell for handover with a current cell even though a radio network controller (RNC) does not provide information of neighboring cells in advance. For this purpose, the UE obtains information of a corresponding cell (neighboring cell for handover) if it is determined that soft handover is required, and receives MBMS data from the corresponding cell depending on information of the obtained corresponding cell, which is performed by the following steps.

Step 1: a UE determines whether soft combining is required.

Step 2: a UE collects information required to receive MBMS data from the corresponding cell.

Step 3: a UE receives MBMS data received from the corresponding cell depending on the collected information, and performs soft combining MBMS data from the corresponding cell with MBMS data from the current cell.

Operations according to the second embodiment of the present invention will be described in detail. In the operations, it is assumed that MBMS data from the corresponding cell is transmitted via MBMS Transport Channel (MTCH) and information for the MTCH (hereinafter referred to as "MTCH information") is transmitted via MCCH. In addition, it is also assumed that the MCCH is transmitted via a Secondary Common Control Physical Channel (S-CCPCH) and information for receiving the MCCH via the S-CCPCH (hereinafter referred to as "MCCH information") is transmitted via a Primary Common Control Channel (P-CCPCH)". However, other assumption besides the above-described assumption can be established.

In the operation according to the second embodiment, a UE continues to monitor to determine whether soft combining is required according to entering handover region. The procedure for determining soft combining according to the handover is described in the first embodiment referring to FIG. 5. If the UE determines that soft combining is required, the UE receives P-CCPCH from a cell where soft combining is required. As assumed above, the UE obtains MCCH information which is required to receive MCCH by receiving the P-CCPCH. The UE receives MCCH transmitted via S-CCPCH depending on the MCCH information and obtains MTCH information by receiving the MCCH. The MTCH information includes an identifier information (ID information) of MBMS services provided from the corresponding cell and channel information for receiving MBMS data according to a specific MBMS service. Therefore, by receiving the MCCH, the UE can check that MBMS service provided from the current cell is also provided from a corresponding cell. If it is determined that the MBMS service which the UE wants to be provided, is provided from a corresponding cell, the UE receives MTCH containing MBMS data which the UE wants to receive by means of channel information included in the MTCH information. The UE can restore the MBMS which the UE wants to receive from the corresponding cell and continue to receive MBMS service from the current cell while receiving MBMS data from the corresponding cell. Therefore, the UE can soft combine the MBMS data received from the corresponding cell with the MBMS data received from the current cell.

Third Embodiment

In the third embodiment of the present invention, a UE receives MCCH information corresponding to each neighboring cell through MCCH from the current cell providing the current MBMS service, and receives MCCH from the corresponding neighboring cell by MCCH information corresponding to the corresponding neighboring cell when soft combining is required in accordance with handover. The UE can obtain MTCH information by receiving the MCCH. The UE receives MBMS data which the UE wants to receive by the obtained MTCH information, and performs soft combining the received MBMS data with MBMS data received from the current cell.

In the foregoing first embodiment to third embodiment, it is assumed that the UE performs soft combining if the handover condition is satisfied. However, if it is determined that soft combining is needed through signal strength from a specific neighboring cell, soft combining can be performed. That is, the above-described first to third embodiments in the present invention are applied to a neighboring cell receiving a signal having larger signal strength than a predetermined threshold value.

As described above, the present invention provides soft handover to a UE when the UE moves to a region where it can receive data from a plurality of Node Bs in an asynchronous CDMA mobile communication system supporting an MBMS service. By doing so, the present invention provides a stable MBMS service although an MBMS user moves from an existing cell to a new cell, contributing to the convenience of the user. In addition, when a UE is located in a handover region, the UE can soft-combine data received from a plurality of Node Bs by itself, contributing to a reduction in transmission power of the Node Bs and an increase in power efficiency.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for soft combining multimedia broadcast/multicast service (MBMS) data from a first Node B and a neighboring Node B in a user equipment (UE) of a code division multiple access (CDMA) mobile communication system, in which the first Node B provides MBMS data for a MBMS service, the user equipment (UE) receives the MBMS data from the first Node B, and neighboring Node Bs are located adjacent to the first Node B, the method comprising the steps of:

collecting MBMS service information including time offset information for a corresponding MBMS service of the neighboring Node Bs from the first Node B;

determining whether soft combining is required, by comparing a measurement value of a signal received from the first Node B with a measurement value of a signal received from at least one of the neighboring Node Bs; and if soft combining is required, receiving MBMS data from the neighboring Node Bs where soft combining is required depending on the MBMS service information, and soft combining the MBMS data received from the neighboring Node B with MBMS data from the first Node B.

2. The method of claim 1, wherein the measurement value is a received signal code power (RSCP) of a common pilot channel.

3. The method of claim 1, wherein the measurement value is a signal-to-noise ratio (Ec/No) of a common pilot channel.

4. The method of claim 1, wherein it is determined that soft combining is required, if the measurement value of the signal received from the neighboring Node B is larger by a predetermined threshold or more than the measurement value of the signal received from the first Node B.

5. The method of claim 1, wherein it is determined that soft combining is required, if a difference between the measurement value of the signal received from the first Node B and the measurement value of the signal received from the neighboring Node B is smaller than a predetermined hysteresis value.

6. The method of claim 1, wherein it is determined that soft combining is required, if a value determined by summing up measurement values of all multipath signals from the neighboring Node B is larger by a predetermined threshold or more than a value determined by summing up measurement values of all multipath signals from the first Node B.

7. The method of claim 1, wherein it is determined that soft combining is required, if a difference between power of a signal received from the neighboring Node B and power of a signal received from the first Node B is smaller than a predetermined hysteresis value.

8. An apparatus for determining whether to soft-combine multimedia broadcast/multicast service (MBMS) data from a first Node B with MBMS data from a neighboring Node B in a user equipment (UE) of a code division multiple access (CDMA) mobile communication system, in which the first Node B provides MBMS data for a MBMS service, the user equipment (UE) receives the MBMS data from the first Node B, and neighboring Node Bs are located adjacent to the first Node B, the apparatus comprising:

a searcher for receiving signals from the first Node B and the neighboring Node B, and outputting measurement values of the received signals; and a controller for determining if soft combining is required by comparing a measurement value of a signal received from the first Node B with a measurement value of a signal received from at least one of the neighboring Node Bs, collecting MBMS service information including time offset information for a corresponding MBMS service of the neighboring Node Bs from the first Node B and assigning fingers for receiving MBMS data from the neighboring Node B where soft combining is required and the MBMS data from the first Node B if soft combining is required, wherein the MBMS data received from the neighboring Node B according to the MBMS service information by the finger assigned to correspond to the neighboring Node B is soft combined with the MBMS data received by the finger assigned to correspond to the first Node B.

9. The apparatus of claim 8, wherein the measurement value is a received signal code power (RSCP) value of a common pilot channel.

10. The apparatus of claim 8, wherein the measurement value is a signal-to-noise ratio (Ec/No) of a common pilot channel.

11. The apparatus of claim 8, wherein the controller determines that soft combining is required, if a value determined by summing up measurement values of all multipath signals from the neighboring Node B is larger by a predetermined threshold or more than a value determined by summing up measurement values of all multipath signals from the first Node B.

12. The apparatus of claim 8, wherein the controller determines that soft combining is required, if a difference between power of a signal received from the neighboring Node B and power of a signal received from the first Node B is smaller than a predetermined hysteresis value.

13. A method for soft combining multimedia broadcast/multicast service (MBMS) data from a first Node B and a neighboring Node B in a user equipment (UE) of a code division multiple access (CDMA) mobile communication system, in which the first Node B provides MBMS data for a MBMS service, the user equipment (UE) receives the MBMS data from the first Node B, and neighboring Node Bs are located adjacent to the first Node B, the method comprising the steps of:

determining whether soft combining is required, by comparing a measurement value of a signal received from the first Node B with a measurement value of a signal received from at least one of the neighboring Node Bs;

if soft combining is required, collecting MBMS service information including time offset information for a corresponding MBMS service from the neighboring Node B where the soft combining is required and receiving MBMS data from the neighboring Node B depending on the MBMS service information; and soft combining the MBMS data received from the neighboring Node B with MBMS data from the first Node B.

14. The method of claim 13, the step of collecting the MBMS service information further comprises the steps of;

receiving information for MBMS control channel over a first common control physical channel from the neighboring Node B; and receiving the MBMS service information over an MBMS control channel depending on the information for the MBMS control channel.

15. The method of claim 13, wherein the measurement value is a received signal code power (RSCP) of a common pilot channel.

16. The method of claim 13, wherein the measurement value is a signal-to-noise ratio (Ec/No) of a common pilot channel.

17. The method of claim 13, wherein it is determined that soft combining is required, if the measurement value of the signal received from the neighboring Node B is larger by a predetermined threshold or more than the measurement value of the signal received from the first Node B.

18. The method of claim 13, wherein it is determined that soft combining is required, if a difference between the measurement value of the signal received from the first Node B and the measurement value of the signal received from the neighboring Node B is smaller than a predetermined hysteresis value.

19. The method of claim 13, wherein it is determined that soft combining is required, if a value determined by summing up measurement values of all multipath signals from the neighboring Node B is larger by a predetermined threshold or more than a value determined by summing up measurement values of all multipath signals from the first Node B.

20. The method of claim 13, wherein it is determined that soft combining is required, if a difference between power of a signal received from the neighboring Node B and power of a signal received from the first Node B is smaller than a predetermined hysteresis value.

21. An apparatus for determining whether to soft-combine multimedia broadcast/multicast service (MBMS) data from a first Node B with MBMS data from a neighboring Node B in a user equipment (UE) of a code division multiple access (CDMA) mobile communication system, in which the first Node B provides MBMS data for a MBMS service, the user equipment (UE) receives the MBMS data from the first Node B, and neighboring Node Bs are located adjacent to the first Node B, the apparatus comprising:

a searcher for receiving signals from the first Node B and the neighboring Node B, and outputting measurement values respectively corresponding to the received signals; and a controller for determining if soft combining is required by comparing a measurement value of a signal received from the first Node B with a measurement value of a signal received from at least one of the neighboring Node Bs, collecting MBMS service information including time offset information for a corresponding MBMS service from the neighboring Node B where the soft combining is required after comparing the measurement values of the searcher, and assigning fingers for receiving MBMS data from the neighboring Node B where soft combining is required and the MBMS data from the first Node B, wherein the MBMS data received from the neighboring Node B according to the MBMS service information by the finger assigned to correspond to the neighboring Node B is soft-combined with the MBMS data received by the finger assigned to correspond to the first Node B.

22. The apparatus of claim 21, wherein the measurement value is a received signal code power (RSCP) value of a common pilot channel.

23. The apparatus of claim 21, wherein the measurement value is a signal-to-noise ratio (Ec/No) of a common pilot channel.

24. The apparatus of claim 21, wherein the controller determines that soft combining is required, if a value determined by summing up measurement values of all multipath signals from the neighboring Node B is larger by a predetermined threshold or more than a value determined by summing up measurement values of all multipath signals from the first Node B.

25. The apparatus of claim 21, wherein the controller determines that soft combining is required, if a difference between power of a signal received from the neighboring Node B and power of a signal received from the first Node B is smaller than a predetermined hysteresis value.

26. The apparatus of claim 21, wherein the MBMS service information comprises information for identifying MBMS services providing from the neighboring Node B and channel information for receiving MBMS data from the neighboring Node B.

27. The apparatus of claim 26, wherein if the information for identifying the MBMS service includes MBMS service identifier provided by the first Node B, the controller assigns fingers for receiving MBMS data from the neighboring Node B.

* * * * *